US008045645B2

(12) United States Patent
Bottomley (10) Patent No.: US 8,045,645 B2
(45) Date of Patent: Oct. 25, 2011

(54) SIGNAL PROCESSOR FOR ESTIMATING SIGNAL PARAMETERS USING AN APPROXIMATED INVERSE MATRIX

(75) Inventor: Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 905 days.

(21) Appl. No.: 11/969,692

(22) Filed: Jan. 4, 2008

(65) Prior Publication Data
US 2008/0304600 A1 Dec. 11, 2008

Related U.S. Application Data

(60) Provisional application No. 60/929,033, filed on Jun. 8, 2007.

(51) Int. Cl.
*H04L 27/00* (2006.01)
*H03K 9/00* (2006.01)
(52) U.S. Cl. ......... 375/316; 375/285; 375/340; 375/346
(58) Field of Classification Search .................. 375/285, 375/316, 340, 346
See application file for complete search history.

(56) References Cited

U.S. PATENT DOCUMENTS

| 5,680,419 | A | 10/1997 | Bottomley | |
|---|---|---|---|---|
| 5,796,788 | A | 8/1998 | Bottomley | |
| 7,003,542 | B2* | 2/2006 | Devir | 708/520 |
| 7,852,951 | B2* | 12/2010 | Kalluri et al. | 375/260 |
| 2003/0053524 | A1 | 3/2003 | Dent | |
| 2005/0201447 | A1 | 9/2005 | Cairns et al. | |
| 2007/0076805 | A1* | 4/2007 | Kalluri et al. | 375/260 |

OTHER PUBLICATIONS

J.G. Proakis, "Equalization Techniques for High-Density Magnetic Recording," IEEE Sig. Proc. Mag., vol. 15, pp. 73-82, Jul. 1998.
T. Uyematsu, et al., "An optimization of the Stable Tap-Adjustment Algorithm for the Fractionally Spaced Equalizer," in Proc. IEEE ICC, Jun. 12-15, 1988, pp. 366-370.
M. Barton, "Performance of SVD-based Fractionally Spaced Equalizers in Data Transmission Systems," IEEE Trans. Sig. Proc., vol. 42, No. 9, pp. 2499-2501, Sep. 1994.
G.W. Stewart, "On the Adjoint Matrix," Technical Report, University of Maryland Computer Science Department; CS-TR-3864 UMIACS; UMIACS-TR-98-02, Oct. 15, 1998.
A. Akritas et al., "Computation of the Adjoint Matrix," Proceedings of the 6$^{th}$ International Conference on Computational Science (ICCS 2006), Reading, UK, May 28-31, 2006, Part II, Editors: Vassil Alexandrov et al., Lecture Notes in Computer Science (LNCS), Springer Verlag Berlin/Heidelberg, vol. 3992, pp. 486-489, 2006.
Simon Haykin, "Adaptive Filter Theory" Second Edition, 1991.
Gerstacker, "On Prefilter Computation for Reduced-State Equalization", IEEE Transactions on Wireless Communications, vol. 1, No. 4, Oct. 2002, pp. 793-800.

(Continued)

*Primary Examiner* — Ted Wang
(74) *Attorney, Agent, or Firm* — Nixon & Vanderhye P.C.

(57) ABSTRACT

A device that estimates information from a signal includes a receiver for receiving an input signal and electronic processing circuitry. The electronic processing circuitry generates a matrix associated with the input signal and determines an approximation of an inverse of the matrix based on the adjoint of the matrix and a scaling factor associated with the determinant of the matrix. This approximation avoids possible mathematical difficulties that may be encountered in certain situations when a typical matrix inversion is calculated. The approximated inverse matrix is applied to the input signal to transform the input signal into an output signal. Information associated with the input signal is then determined based on the output signal.

27 Claims, 6 Drawing Sheets

OTHER PUBLICATIONS

U.S. Appl. No. 11/739,126, filed Apr. 24, 2007, Caines et al., "Robust Multicode Detection for HSDPA".

U.S. Appl. No. 11/739,924, filed Apr. 25, 2007, Wang et al., "Efficient Computation of a Waveform Correlation Matrix".

* cited by examiner

SIGNAL PROCESSOR FOR ESTIMATING SIGNAL PARAMETERS USING AN APPROXIMATED INVERSE MATRIX

This application claims priority from the provisional U.S. patent application Ser. No. 60/929,033, filed on Jun. 8, 2007, the contents of which are incorporated herein by reference.

TECHNICAL FIELD

The technical field is technology applications that use inverse matrices in processing signals. Non-limiting applications include receiver processing, equalization, received signal quality determination, adaptive beamforming, radar, sonar, etc.

BACKGROUND

Many signal processing applications use matrix-based calculations. One example is channel equalization in wireless communications. Example equalization techniques that use matrices include linear equalization techniques, such as generalized Rake (G-Rake) and chip equalization, frequency-domain linear equalization, linear turbo equalization, decision feedback equalization (DFE) that includes a linear, feedforward filter, and prefiltering, a form of partial linear equalization used, e.g., in GSM/EDGE, WiFi, WiMAX, and LTE. In addition to wireless systems, linear equalization techniques are used for wireline modems and magnetic recording. Another matrix-driven signal processing area is antenna array processing involving multiple receive antennas. Array processing and equalization are often performed together.

Consider the following example filter or weight computation taken from a linear equalization and array processing context, which is typical of the type of matrix-based calculations that modern signal processors must calculate. Received signal quantities, such as samples from different time delays and receive antennas or prefiltered quantities such as Rake-combined values, can be collected into a column vector x. This vector can often be modeled as $$x = hs + n,$$

where s is a modulation symbol to be recovered, h is a channel response accounting for the effects of the transmitter, transmission medium, and receiver front-end, and n is a vector of noise and interference (impairment). A soft symbol estimate can be obtained by applying a filter or combining vector to the received vector x, giving $$\hat{s} = w^H x$$

where superscript "H" denotes Hermitian transpose (conjugate transpose). The filter or weight computation involves solving a set of equations of the form $$Rw = h, \quad (1)$$

where R is a data or impairment covariance matrix, w is a vector of combining weights or filter coefficients, and h is a signal that represents a channel response associated with R. Equation (1) is typically solved one of two ways:
1) iteratively, using Gauss-Seidel, conjugate gradient, or other approaches, or
2) non-iteratively, by inverting R or using a factorization such as Cholesky factorization or QR decomposition.

The second approach is of interest here because it requires inverting the matrix R.

An inverted matrix computation also exists in some signal quality estimation computations, e.g., signal-to-interference-plus-noise ratio (SINR) or simply SIR. SINR may be estimated for a variety of applications including, in the example context of wireless communications, power control, rate adaptation, and as a metric for processing delay selection. If the weights w in equation (1) are used in a linear receiver, the signal quality can be estimated as $$SINR = h^H R^{-1} h = w^H h = h^H w \quad (2)$$

Again, an inverted matrix $R^{-1}$ must be calculated.

In addition to equalization and some signal quality determinations having to invert a matrix, linear multi-user detection techniques, such as linear minimum mean squared error (MMSE) and decorrelator detection, also involve inverting a matrix and applying the result to chip samples or despread symbols to demodulate the symbols transmitted. In this case, the matrix may consist of symbol waveform correlations or chip sample correlations.

The weights or filter coefficients are parameters combined with a received or other input signal in order to estimate some kind of information like received data symbols, SINR, position, direction-of-arrival, etc. Another parameter estimation application is channel estimation. Certain channel estimation techniques involve solving a set of equations or inverting a matrix. Examples include Wiener or MMSE channel estimation and recursive channel estimation, such as Kalman filtering and recursive least squares (RLS) filtering. With adaptive filtering, a matrix inverse is often updated recursively. A similar parameter estimation problem occurs in radar and sonar signal processing.

Signal processing applications like those examples described above that require inverting a matrix confront a numerical problem when the matrix R to be inverted is "ill-conditioned." An ill-conditioned matrix is one where the ratio of its largest eigenvalue to smallest eigenvalue is large. There are different possible approaches to address this problem. One is based on regularization where a small positive value is added to the diagonal of matrix R to improve the conditioning of R so that the matrix is easier to invert. A drawback with this approach is that the accuracy of the matrix calculation is affected, which potentially sacrifices some performance in the signal processing end result. Another approach is based on virtual noise where a second matrix Q is added to the matrix R. Matrix Q represents the covariance of an imaginary noise source (regularization can be viewed as a special case of virtual white noise). The difficulty is again selecting Q so that performance is not sacrificed. Noise corresponding to frequencies where there is no signal energy could be added, but that has limited application and efficacy. The third approach is based on singular value decomposition (SVD) equalization where the received signal is projected onto the major eigenvectors of its received covariance matrix. But this approach is complex, requiring calculation of eigenvalues and eigenvectors, and it also sacrifices performance.

What is needed is a simple and effective way to invert a matrix that can handle ill-conditioned numbers and still provide good performance across a wider variety of signal processing applications.

SUMMARY

That need is satisfied by the technology described below. A device is provided that includes a receiver for receiving an input signal and electronic processing circuitry. The electronic processing circuitry generates a matrix associated with the input signal and determines an approximation of an inverse of the matrix based on the adjoint of the matrix and a scaling factor associated with the determinant of the matrix, e.g., by multiplying the adjoint of the matrix by the scaling factor associated with a determinant of the matrix. This approximation avoids possible mathematical difficulties that may be encountered in certain situations when a typical matrix inversion is calculated. The approximated inverse matrix is applied to the input signal to transform the input signal into an output signal. Information associated with the input signal is then determined based on the output signal.

In non-limiting example embodiments, the adjoint of the matrix may be applied to the input signal to transform the input signal into an intermediate signal and then to apply the scaling factor to the intermediate signal to produce the output signal. The inverse of the matrix may be approximated by the adjoint of the matrix and a scaling function associated with a determinant of the matrix, where the scaling function determines when the magnitude or magnitude-square (or some other function) of the determinant of the matrix falls below a predetermined threshold. In some applications, the matrix R is positive semi-definite or positive definite, allowing the scaling function to be determined by thresholding the determinant directly. In addition, the output signal may be compensated for the approximation, if that is desired. For example, the output signal can be scaled to offset scaling associated with the scaling function.

The technology has application in many applications where information is estimated. For example, the receiver may be a wireless receiver (e.g., a G-RAKE receiver), a wired receiver, a radar receiver, or a sonar receiver. The electronic processing circuitry may be used to digitally filter the input signal, equalize the input signal, estimate a communications channel used to convey the input signal, determine a signal quality associated with the input signal, perform multi-user detection using the approximated inverse matrix, or estimate a position (in radar or sonar applications).

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). It will be apparent to one skilled in the art that other embodiments may be practiced apart from the specific details disclosed below.

Figure 1:
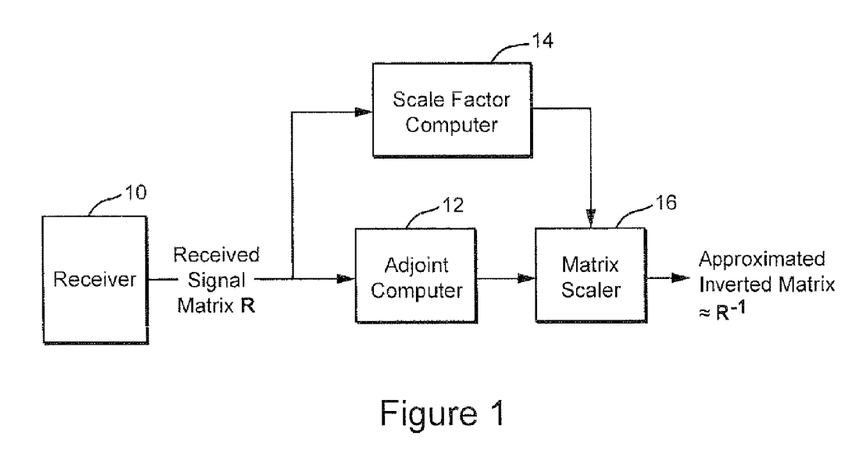
FIG. 1 illustrates an example device for approximating an inverse of a matrix.

FIG. 1 illustrates an example device for approximating an inverse of a matrix. A receiver 10 receives an input signal and generates a matrix R that is provided to a scale factor computer 14 and an adjoint computer 12. The adjoint computer 12 computes the adjoint of the matrix R "adj(R)" as described below. The scale factor computer 14 determines a scale factor or function that is chosen to avoid numerical issues. Specifically, the scale factor is chosen to avoid overflow issues which occur when numbers get too large. The scale factor or function may be applied by matrix scaler 16 to the adjoint of the matrix R in appropriate situations to generate an approximated inverted matrix $\approx R^{-1}$.

An adjoint of a matrix may be calculated as described below for a 3×3 matrix. It is known how to determine the adjoint of other size matrices. In general, the adjoint or adjugate matrix of a square matrix is the transpose of the matrix formed by the cofactors of elements of R. To calculate adjoint of matrix R, the following are performed: a) calculate the minor for each element of the matrix, b) form a cofactor matrix from the minors calculated, and c) form the adjoint from cofactor matrix.

An example 3×3 matrix R is given by $$R = \begin{bmatrix} 1 & 2 & 3 \\ 4 & 5 & 6 \\ 7 & 8 & 9.01 \end{bmatrix}$$

To calculate the minor for an element, the elements that do not fall in the same row and column of the minor element are used to calculate a determinant. Thus $$\begin{aligned} \text{Minor of row 1 } col. 1 &= M_{11} \\ &= \begin{vmatrix} 5 & 6 \\ 8 & 9.01 \end{vmatrix} \\ &= 5 \times 9.01 - 6 \times 8 \\ &= -2.95. \end{aligned}$$

$$\begin{aligned} \text{Minor of row 1 } col. 2 &= M_{12} \\ &= \begin{vmatrix} 4 & 6 \\ 7 & 9.01 \end{vmatrix} \\ &= 4 \times 9.01 - 6 \times 7 \\ &= -5.96. \end{aligned}$$

etc.

A matrix is then formed with the minors calculated:

$$M = \begin{bmatrix} -2.95 & -5.96 & -3 \\ -5.98 & -11.99 & -3 \\ -3 & -6 & -3 \end{bmatrix}$$

The cofactors are then found from the minors. A signed minor is called a cofactor. The cofactor of the element in the $i^{th}$ row, $j^{th}$ column is denoted by $C_{ij}=(-1)^{i+j}M_{ij}$. Thus, + and − values are applied alternatively, starting with + in the upper left corner. This gives $$C = \begin{bmatrix} -2.95 & 5.96 & -3 \\ 5.98 & -11.99 & 3 \\ -3 & 6 & -3 \end{bmatrix}$$

The adjoint of the matrix R is then calculated by transposing the cofactor matrix, which corresponds to putting the elements in the rows into the columns in the cofactor matrix. i.e., convert the elements in the first row to the first column, the second row to the second column, and the third row to the third column.

$$adj(R) = \begin{bmatrix} -2.95 & 5.98 & -3 \\ 5.96 & -11.99 & 6 \\ -3 & 3 & -3 \end{bmatrix}$$

Figure 2:
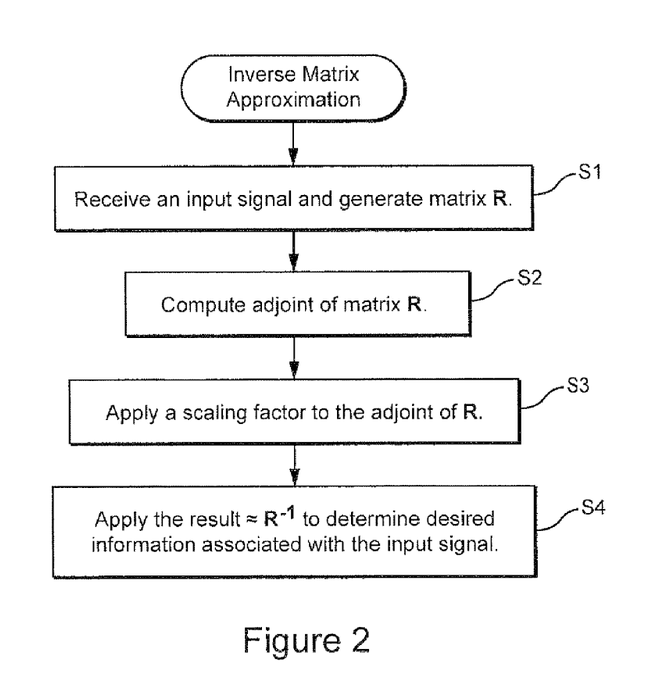
FIG. 2 is flowchart illustrating non-limiting, example procedures for use in the device of FIG. 1 where the approximated inverse matrix is applied to determine desired information associated with an input signal.

FIG. 2 is a flowchart illustrating non-limiting, example procedures for use in the device of FIG. 1 where the approximated inverse matrix is applied to determine desired information associated with an input signal. An input signal is received, and from that input signal matrix R is generated (step S1). The adjoint of matrix R is computed (step S2), and a scaling factor or function is applied to the adjoint (step S3). The resulting approximation of the inverse of matrix R is applied in a manner depending on the signal processing application to determine desired information associated with the input signal (step S4).

The inverse of matrix R may be determined from its adjoint and determinant as follows:

$$R^{-1} = \left(\frac{1}{\det(R)}\right) adj(R) \quad (2)$$

The adjoint determination (adj(R)) was just described above. A determinant of square matrix R (det(R)) is a single number calculated by combining all the elements of the matrix R. A determinant of a 2×2 matrix R may be determined as:

$$\begin{vmatrix} 1 & 2 \\ 3 & 4 \end{vmatrix} = 1 \times 4 - 2 \times 3 = -2$$

The determinant of a 3×3 matrix or larger may be determined using Laplacian expansion, in which the determinant is given by the sum of the elements in a row of the matrix times their cofactors. For the 3×3 example above, the determinant can be calculated using the first row as

|R|=1×(−2.95)+2×5.96+3×(−3)=−0.03

In terms of ill-conditioned numbers, the determinant |R| can be used to calculate the inverse of a matrix R only when the determinant |R| is not equal to or close to zero. A computing device has great difficulty dividing by zero or even a very small number close to zero, (examples of a numerical issue). But this situation can not always be avoided.

Although matrix R may be ill-conditioned or even singular (determinant=0), such that the det(R) is close to or even zero, the adjoint of matrix R is still well behaved, so that the inverse matrix $R^{-1}$ can be approximated as:

$$R^{-1} \approx f(R) adj(R) \quad (3)$$

where the scaling factor or function $f(R)$ is chosen to avoid numerical issues like division-by-zero or by a small number as described above. For example, $$f(R) = \begin{cases} 1/\det(R), & \det(R) > 1/f_{max} \\ f_{max}, & \text{otherwise} \end{cases} \quad (4)$$

wherein $1/f_{max}$ or $f_{max}$ is a threshold value determined based on the precision limits of the device computing the inverse. Accordingly, if the determinant of R is greater than one divided by the threshold, then equation (3) effectively becomes equation (2). But if the determinant of R is equal to or less than one divided by the threshold, then the inverted matrix is approximated by multiplying the threshold value on $f$ and the adjoint of the matrix R. For applications where the determinant of R can be negative or complex, the magnitude-square or some function of the determinant of R would be limited.

In one non-limiting example, it might be appropriate to limit det(R) to a value of 0.1 or greater because dividing by a value less than 0.1 might result in numerical overflow. Accordingly, 1/0.1=10, so that $f_{max}=10$. The scaling number 10 may be smaller than 1/det(R), but for many applications, simply multiplying by a scalar does not affect the accuracy of the process. For example, if the process is a linear filtering process to detect whether a received BPSK signal is a + or a − symbol, it does not matter whether the signal is +1 or +100, because it will in both cases be detected as a + symbol. In those situations where scaling is a concern, a compensating scaling factor can be applied to the result of equation (4) after equation (4) is calculated to avoid possible complications with processing ill-conditioned numbers.

Consider the simple 2×2 matrix:

$$R = \begin{bmatrix} 1.001 & 1 \\ 1 & 1.001 \end{bmatrix}$$

Its inverse is given by:

$$R^{-1} = \begin{bmatrix} 500.2499 & -499.7501 \\ -499.7501 & 500.2499 \end{bmatrix}$$

Figure 9:
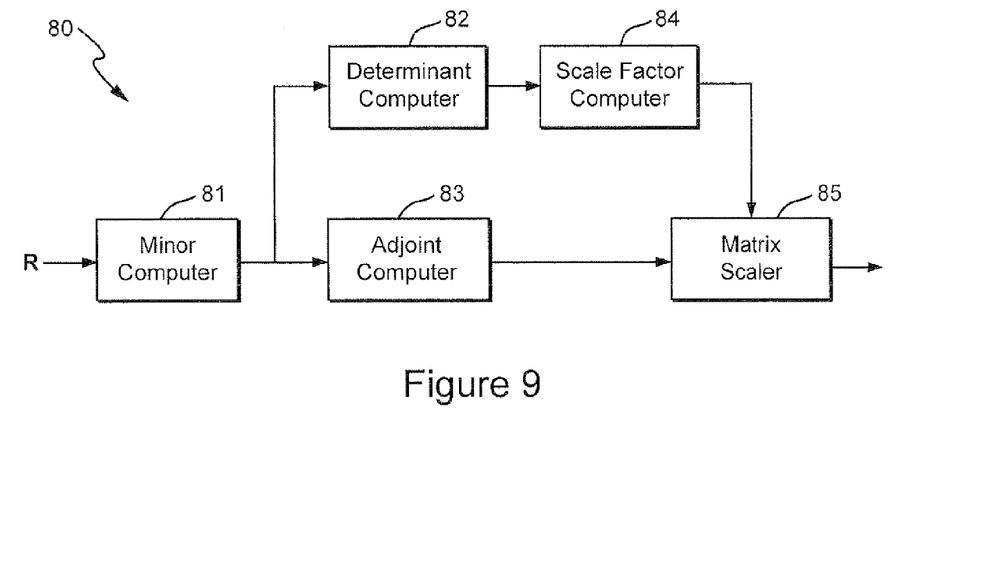
FIGS. 9 and 10 illustrate other non-limiting example embodiments
Figure 10:
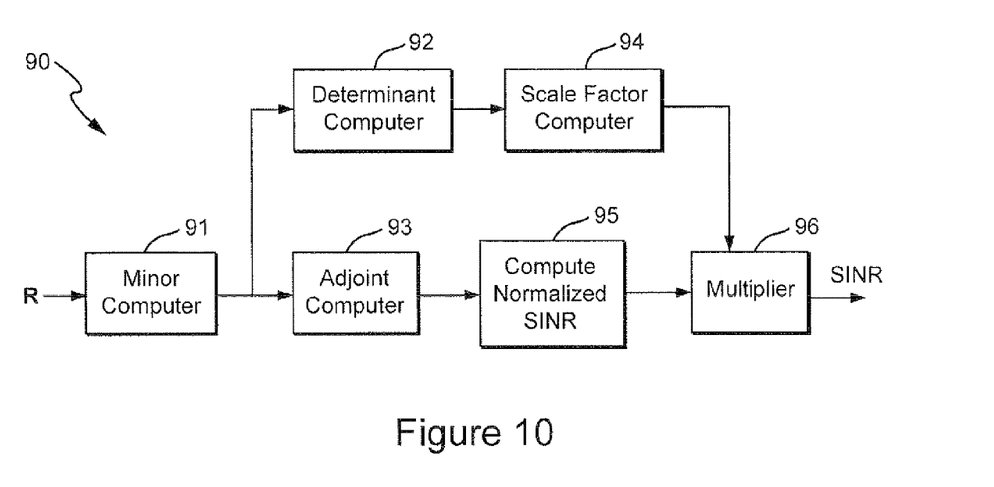

Computing this inverse matrix conventionally may lead to numerical issues. In fact, even representing the large values in the inverse may be a problem. With the technology described above, the adjoint matrix and determinant of the matrix are computed instead. Because both the adjoint and determinant use cofactors (or minors), those computed cofactors can be shared in the computations (as illustrated in the examples of FIGS. 9 and 10 described below). For a 2×2 matrix, the adjoint is calculated simply by switching the diagonal elements and negating the off diagonals resulting in:

$$adj(R) = \begin{bmatrix} 1.001 & -1 \\ -1 & 1.001 \end{bmatrix}$$

$$\det(R) = 0.002001$$

The determinant value is compared to a threshold before computing its reciprocal. Because the value of 0.002001 is less than the example threshold of 0.1, the determinant is limited or "clipped" to 0.1. This gives a maximum value of the inverse of the determinant of 10. Thus, the inverse would be computed as 10× adjoint of the matrix R:

$$R^{-1}_{approximated} = \begin{bmatrix} 10.01 & -10 \\ -10 & 10.01 \end{bmatrix}$$

Observe that these inverted matrix values are smaller and easier to represent with finite precision by a computer. If in the application for this example, a scaled version of the inverse matrix does not affect performance, then an adjustment to the inverse matrix is not needed. For applications where scaling makes a difference, e.g., calculation of SINR, then an adjustment can be made. Because the determinant is really 0.002001, but was clipped to 0.1, the scaling affects the absolute result by a factor of 0.1/0.002001=49.975 (approx. 50). For an example SINR calculation, this factor of about 50 may be applied later (e.g., multiplied) to the SINR computed based on using the approximated inverse R to determine the true SINR value.

Computing the adjoint of a matrix can be more complex than calculating the inverse of a matrix using other techniques that do not require computing the adjoint. Nevertheless, computing the adjoint of a matrix is well-structured and well-behaved. As shown in the adjoint calculation approach shown above, computing the adjoint requires forming cofactors and taking a transpose which only involve multiplies, adds, and substitutions, rather than divisions and subtractions.

Often the matrix R is Hermitian so that the adjoint is also Hermitian, which reduces the number of computations to the upper or lower matrix triangles. If R has other properties that impose structure on the inverse, such properties can be used to simplify adjoint computations. Also, approaches exist that reduce complexity and/or allow parallel implementations, advantageous for hardware implementation.

A non-limiting complex number/Hermitian example is provided below. A Hermitian operation implies a conjugate transpose. The transpose of a matrix involves moving the first row into the first column, the second row into the second column, etc. The conjugate means negating or changing the sign of the imaginary part of a complex number. For example, for the following matrices (i denotes imaginary component):

$$A = \begin{bmatrix} 1 & 2+i \\ 3-i & 4 \end{bmatrix}, v = \begin{bmatrix} 2-3i \\ 1+4i \end{bmatrix}$$

their respective Hermitian transposes are given by:

$$A^H = \begin{bmatrix} 1 & 3+i \\ 2-i & 4 \end{bmatrix}, v^H = \begin{bmatrix} 2+3i & 1-4i \end{bmatrix}$$

A matrix is "Hermitian" if the matrix equals its conjugate transpose. An example Hermitian matrix is:

$$A = \begin{bmatrix} 1 & 2+i \\ 2-i & 4 \end{bmatrix}$$

Figure 3:
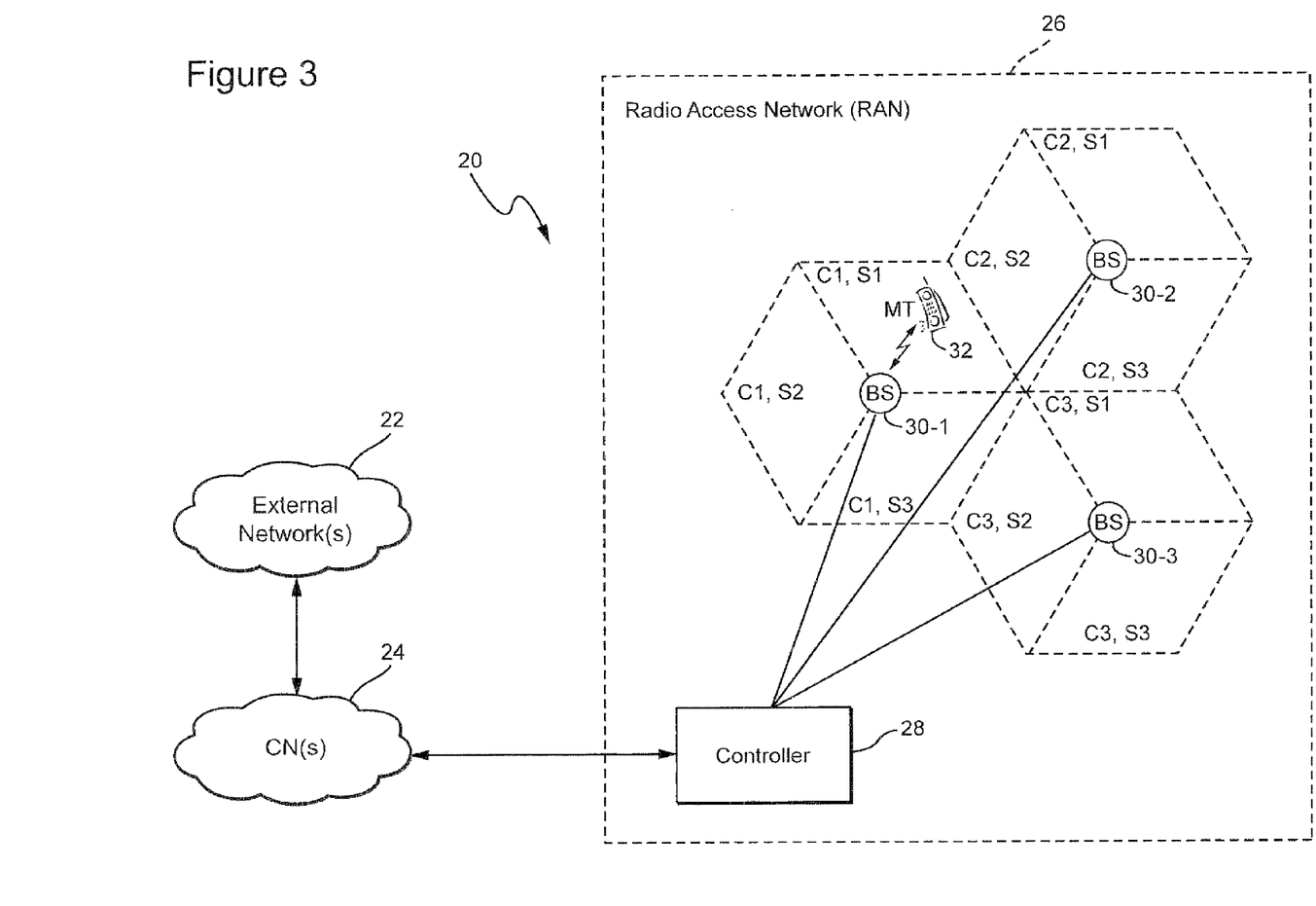
FIG. 3 is a diagram illustrating a mobile radio communications system which is one non-limiting example environment where the device in FIG. 1 may be employed.

FIG. 3 is a diagram illustrating a mobile radio communications system 20 which is one non-limiting example environment where the device in FIG. 1 may be employed. The radio communication network 20 may be configured as a WCDMA wireless cellular network, as a GSM/EDGE or IS-95/IS-2000 wireless cellular network, an LTE wireless cellular network, or configured according to some other open or proprietary communication standard. The particular network architecture adopted and the entity nomenclature used may vary according to the network standard involved. The network 20 supports a plurality of mobile terminals 32 (also referred to as user equipments (UEs))—only one terminal is shown for clarity—operating in one or more radio service areas denoted as C1, S1, C2, S2, and so on, to represent Cell 1, Sector 1 and Cell 2, Sector 2, etc. Those skilled in the art will appreciate that the terms "cell" and/or "sector" as used herein should be given broad construction and, in general, the term sector should be understood as identifying a given radio coverage area at a given carrier frequency. Thus, a given cell may have multiple overlaid radio sectors corresponding to multiple carrier frequencies.

In any case, network 20 allows mobile terminals 32 to communicate with one or more external networks 22, such as the Public Switched Telephone Network (PSTN), the Internet or other Public Data Networks, ISDN-based networks, etc. That communication is supported by a Radio Access Network (RAN) 26, which provides the radio link(s) to the mobile terminals 32, and which interfaces to one or more Core Networks (CNs) 24 that in turn link to the external networks 22. The RAN 26 includes one or more base station systems, each typically comprising a control entity and one or more radio transceiver entities. In the figure, the control unit is labeled in a non-limiting fashion Base Station Controller (BSC) 28, and the transceivers as Radio Base Stations (RBSs) 30, e.g., 30-1, 30-2, and 30-3. The illustrated mobile terminal 32 also includes a control unit and a radio transceiver.

Figure 4:
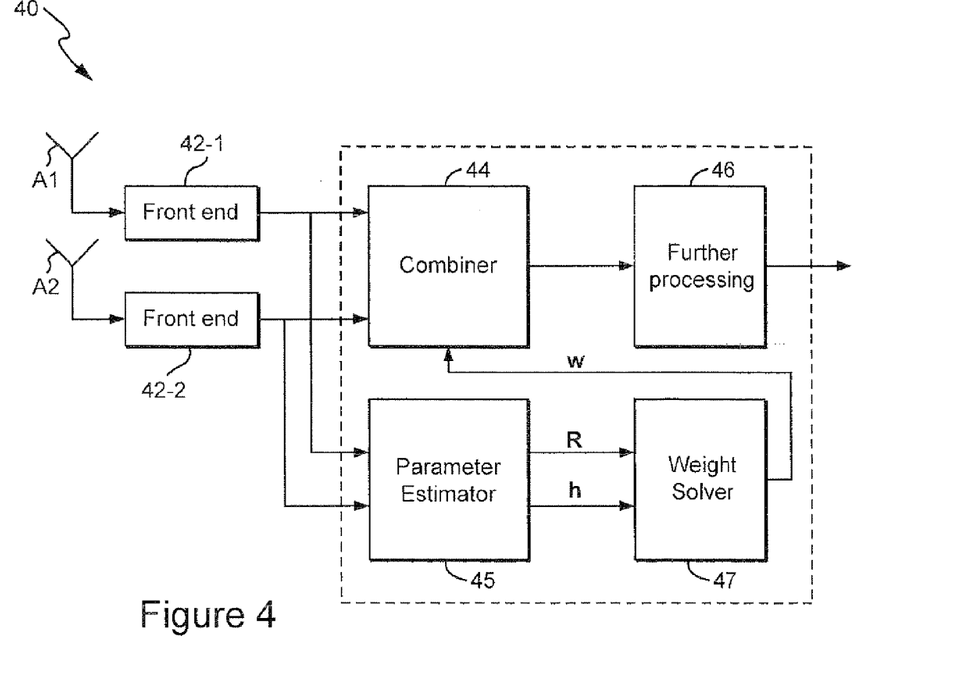
FIG. 4 is a function block diagram of an array processing type radio receiver which is one non-limiting application in the environment of FIG. 3 where the device in FIG. 1 may be employed.

FIG. 4 is a function block diagram of a multiple antenna array processing type radio receiver that may be used in a radio base station or mobile terminal which is one non-limiting application in the environment of FIG. 3 where the device in FIG. 1 may be employed. Recall that filter or weight computations often involve solving a set of equations of the form Rw=h, where R is a data or impairment covariance matrix, w is a vector of combining weights or filter coefficients, and h is a signal that represents a channel response associated with the received signal. In array processing, R corresponds to the data (MMSE array processing) or impairment (approximate maximum likelihood (ML)) correlation matrix across two or more receive antennas A, h corresponds to the channel response, and w corresponds to antenna and/or delay combining weights. In FIG. 4, two antennas A1 and A2 are shown for illustrative purposes with the understanding that any number of antennas could be used. Respective front-end processors 42-1 and 42-2 convert the received antenna signals from radio frequency to baseband frequency. These baseband signals are provided to a parameter estimation unit 45 that estimates the data or impairment R and the channel response h. These estimates are then provided to a weight solver 47, which produces combining weights w. The combining weights w, along with the received baseband signals, are provided to a combiner 44, which combines the received baseband signals according to the equation:

$$z = w^H x \tag{4}$$

where z is a detection statistic, such as a soft symbol estimate. It can be used, for example, in a decoder to decode a convolutional or turbo code.

Figure 5:
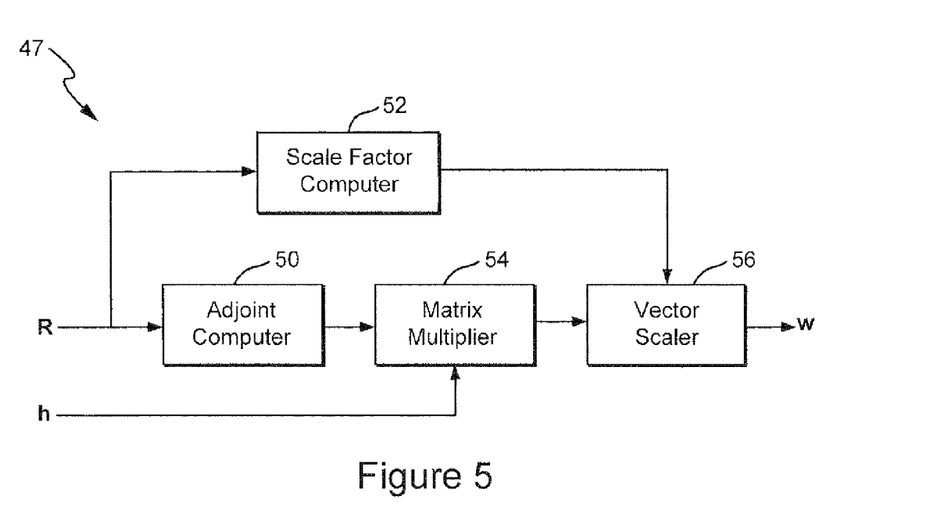
FIG. 5 is non-limiting example function block diagram of a weight solver that may be used in the radio receiver of FIG. 4.

FIG. 5 is a function block diagram of a non-limiting example weight solver that may be used in the radio receiver of FIG. 4. The adjoint computer 50 computes the adjoint of matrix R using, for example, the technique described above, although other techniques could be used. The adjoint of matrix R is provided to a matrix multiplier 54, which multiplies it with the channel response h. The resulting vector is then scaled in the vector scaler 56 by the output of the scale factor computer 52 to produce the combining weights w. Note that this is an example where the adjoint is applied to "signal" h, creating an intermediate signal to which the scaling factor is then applied.

Figure 6:
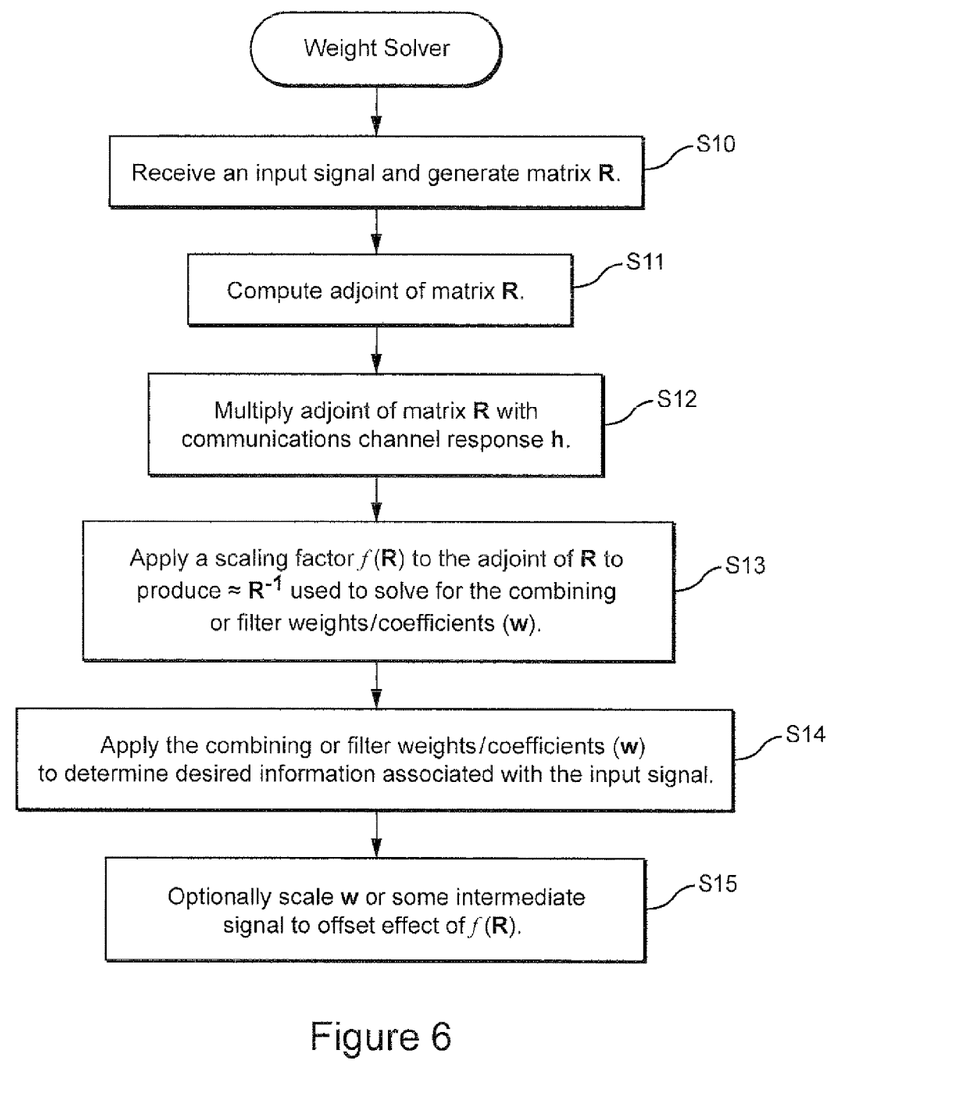
FIG. 6 is flowchart illustrating non-limiting, example weight solver procedures for use in the device of FIG. 4.

FIG. 6 is flowchart illustrating non-limiting, example weight solver procedures for use in the device of FIG. 4. Initially, an input signal is received and used to generate a matrix R (step S10). The adjoint of matrix R is computed (step S11) and multiplied by the communications channel response h (step S12). A scaling factor f(R) in accordance with equation (4) may then be applied to the product of the adjoint of R and h to produce combining or filter weights/coefficients w in accordance with an approximation of equation (1) (step S13). The combining or filter weights/coefficients w are applied to determine desired information, e.g., information symbols, SINR, etc. (step S14). An optional step (step S15) might be to scale w or some intermediate signal to offset the effect of the scaling factor f(R) if desired.

Figure 7:
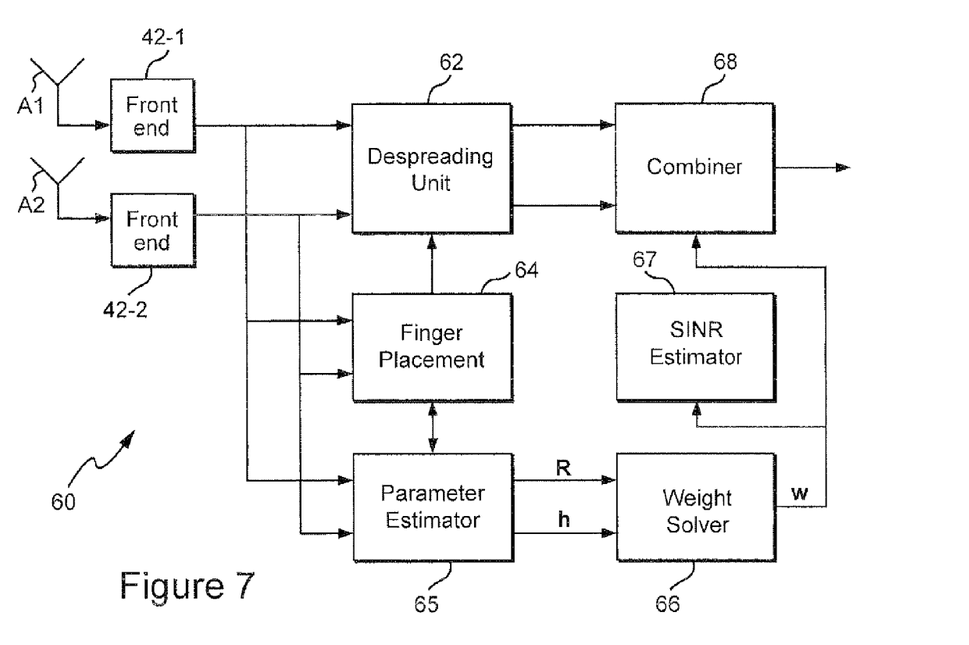
FIG. 7 is a function block diagram of an array processing type radio receiver which is one non-limiting application in the environment of FIG. 3 where the device in FIG. 1 may be employed.

As a non-limiting example, a generalized-Rake (G-Rake) receiver 60 in a spread spectrum communications system with two antennas is considered in FIG. 7 (a different number of antennas could be used). Similar processing occurs for chip equalization, except that despreading is performed after combining (filtering). As in FIG. 4, two antennas A1 and A2 are shown for illustrative purposes with the understanding that two or more antennas could be used. Respective front-end processors 42-1 and 42-2 convert the received antenna signals from radio frequency to baseband frequency. These baseband signals are provided to a parameter estimation unit 65 that estimates the data or impairment matrix R and the channel response h. These estimates are then provided to a weight solver 66, which produces combining weights w. The combining weights w, along with the received baseband signals, are provided to a combiner 68, which combines the received baseband signals according to the equation: $z = w^H r$. Recall that $R_{approximated}^{-1}$ determined in accordance with equation (3) is used to compute the combining weights w.

The antenna inputs are also provided to a despreading unit 62 for despreading using an appropriate spreading code and to a RAKE finger placement unit 64 which determines which delayed versions of the received signals will be despread in the despreading unit 62. The parameter estimator 65 provides path delays to the finger placement unit 64 to finger delays. The despread values generated by the despreader 62 are filtered in the combiner 68 using the weights w in order to compensate for channel effects and noise.

Another non-limiting application area is equalization. With linear turbo equalization, filtering weights are computed and usually re-computed at each iteration. The inverted matrix $R^{-1}$ determined in accordance with equation (3) is used to compute those filtering weights. Decision feedback equalization, although nonlinear, includes feedforward (FF) and feedback (FB) filters, both of which are linear. Solving for the filter coefficients or weights in these filters involves inverting a matrix. For example, in FF filter coefficient calculations involve a data covariance inverse. The inverted matrix $R^{-1}$ determined in accordance with equation (3) can be applied to that inverse computation. Sometimes prefiltering, a form of linear partial equalization, is applied to achieve simpler subsequent processing. In GSM/EDGE, prefiltering computations involve solving a set of equations, requiring a matrix to be inverted. Another prefiltering technique for GSM/EDGE involves solving a set of Yule-Walker equations. The approximation $R_{approximated}^{-1}$ can be applied to solve these equations.

Another non-limiting application is an MMSE linear multi-user detector and a linear multi-user decorrelator, both which require inversion of a matrix. The inverted matrix $R^{-1}$ determined in accordance with equation (3) can be used to improve numerical stability in these applications.

Another non-limiting application is channel estimation which often involves a matrix inverse. For example, with Kalman filtering, a P matrix corresponding to an inverse of an R matrix is updated. The R matrix may be updated and then its inverse approximated in accordance with equation (3).

Another non-limiting application is determining received signal quality like SINR. Because f(R) is a scalar, it can be applied to the data before combining, to h or to the combined result (the soft output). Thus, the weights can be computed using $$w = f(R)[adj(R)h] \tag{5}$$

The SINR of a received signal, for example, may then be estimated using one of the following:

$$SINR = f(R)h^H adj(R)h = w^H h = h^H w \tag{6}$$

where w is determined using equation (5).

Figure 8:
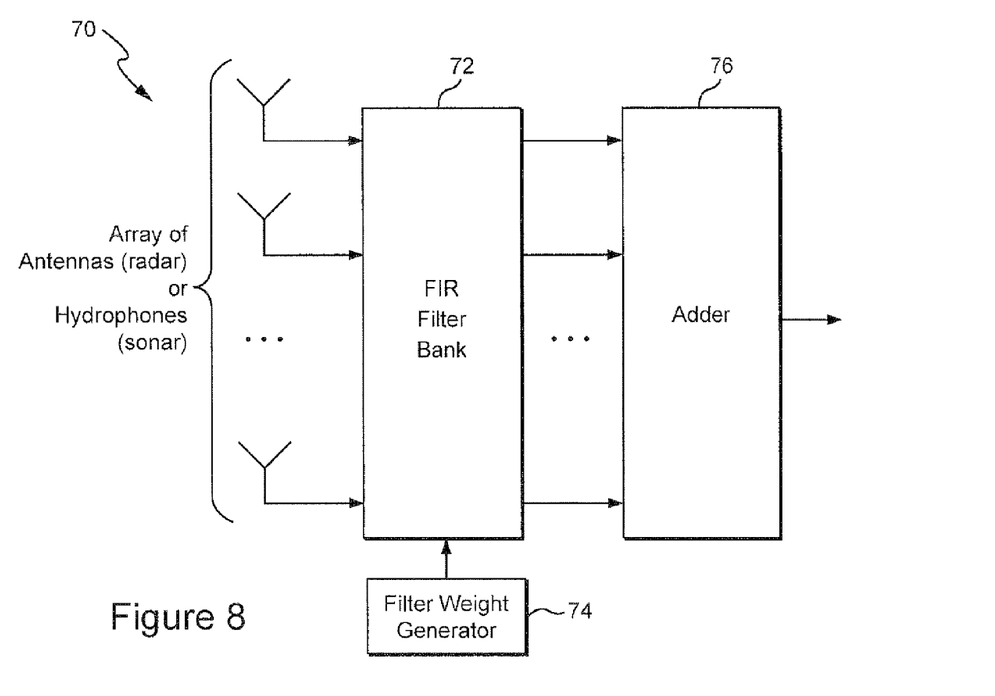
FIG. 8 is a function block diagram of a radar or sonar receiver which is another non-limiting application of FIG. 3 where the device in FIG. 1 may be employed.

Another non-limiting example application for this technology is radar and sonar in which detection statistics are formed. FIG. 8 is a function block diagram of a radar or sonar receiver 70 which is another non-limiting application of FIG. 3 where the device in FIG. 1 may be employed. Adaptive beamforming, used in wireless communications (radio and acoustic), is also used in radar and sonar to null signals which are not in the direction of interest. A sensor array of antennas or hydrophones are used to obtain signals. In the case of antennas, the received RF signals are mixed down to baseband and complex baseband samples are recovered. The baseband signals are then provided to a bank of finite impulse response (FIR) filters 72 so that each array sensor signal is filtered. The filter coefficients or weights are determined and provided by a filter weight generator 74. The filter weight generator can involve inverting a matrix which is where the technology in this application may be used. For example, with a Direct Matrix Inversion (DMI) form of adaptive beamforming, a data correlation matrix is inverted to determine the weights. Although not shown, in this case, the filter weight generator 74 also receives the sensor signals as input. The filter outputs are added in the adder 76 and possibly further processed to form detection statistics in the case of radar and sonar. Other examples of applications for this technology include system identification, layered earth modeling, predictive deconvolution, linear predictive coding, spectrum analysis, signal detection, adaptive noise cancellation, echo cancellation, and radar polarimetry.

Other non-limiting example embodiments are now described in conjunction with FIGS. 9 and 10. FIG. 9 illustrates one example matrix inverter 80 where minors (or cofactors) are shared in the computation of the adjoint and determinant. A minor computer 81 computes the minors of each element of the matrix R. Those matrix element minors are then used by a determinant computer 82 in calculating the determinant of R and by an adjoint computer 83 in calculating the adjoint of R. A scale factor computer 84 receives the determinant to decide on the scaling factor which is then provided to the matrix scaler 85 to determine the approximate inverse matrix in accordance with equation (3).

For SINR estimation, it may be acceptable to use just the matrix determinant itself unless the SINR gets above a maximum value. FIG. 10 shows an example SINR estimator 90 where the scale factor computer 94 ensures that the final SINR value does not overflow. A minor computer 91 computes the minors of each element of the matrix R. Those matrix element minors are then used by a determinant computer 92 in calculating the determinant of R and by an adjoint computer 93 in calculating the adjoint of R. Unit 95 computes a normalized SINR from the adjoint of the matrix R, using $$SINR_{norm} = h^H \text{adj}(R) h$$

Scale factor computer 94 receives the determinant and the normalized SINR value (connection not shown) to decide on the scaling factor which is then provided to a multiplier 96 which can multiply the scaling factor with the normalized SINR to generate an SINR value. The scaling factor is selected to avoid overflow. For example, $$f(\det(R)) = \begin{cases} 1/\det(R) & \text{if } \det(R) > SINR_{norm}/SINR_{max} \\ f_{max} = SINR_{max}/SINR_{norm} & \text{otherwise} \end{cases}$$

where the max SINR value is determined by the precision of the device. Further simplification is possible in which the SINR is set to the maximum value when the determinant of R falls below the normalized SINR divided by the maximum SINR.

The technology described above provides for parameter estimation requiring an inverted matrix using an adjoint of that matrix and a scaling factor or function. This avoids numerical difficulties and improves receiver performance in situations where such numerical difficulties either cause poor performance or are addressed by existing methods that sacrifice performance.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A device for estimating information from a signal, comprising:
a receiver for receiving an input signal, and electronic processing circuitry coupled to the receiver and configured to:
generate a matrix associated with the input signal;
determine an approximation of an inverse of the matrix based on the adjoint of the matrix and a scaling factor associated with the determinant of the matrix;
apply the approximated inverse matrix to the input signal to transform the input signal into an output signal; and
determine information associated with the input signal based on the output signal,
wherein the electronic processing circuitry is configured to digitally filter the input signal using weights derived from the approximated inverse matrix.

2. The device in claim 1, wherein the electronic processing circuitry is configured to approximate the inverse of the matrix by multiplying the adjoint of the matrix by the scaling factor associated with a determinant of the matrix.

3. The device in claim 1, wherein the electronic processing circuitry is configured to apply the adjoint of the matrix to the input signal to transform the input signal into an intermediate signal and then to apply the scaling factor to the intermediate signal to produce the output signal.

4. The device in claim 1, wherein the electronic processing circuitry is configured to approximate the inverse of the matrix by an adjoint of the matrix and a scaling function associated with a determinant of the matrix, said scaling function comprising thresholding a function of the determinant of the matrix.

5. The device in claim 4, wherein the electronic processing circuitry is configured to compensate the output signal for the approximation.

6. The device in claim 1, wherein the electronic processing circuitry is configured to scale the output signal to offset scaling associated with the scaling function.

7. The device in claim 1, wherein the matrix R is Hermitian symmetric.

8. The device in claim 1, wherein the inverse of matrix R is defined as:

$$R^{-1} = \left(\frac{1}{\det(R)}\right) adj(R)$$

where $$\left(\frac{1}{\det(R)}\right)$$

where is the determinant of matrix R and adj(R) is the adjoint of matrix R, wherein the electronic processing circuitry is configured to approximate the inverse of matrix R using: $R^{-1} \approx f(R) adj(R)$, wherein $$f(R) = \begin{cases} 1/\det(R), & \det(R) > 1/f_{max} \\ f_{max}, & \text{otherwise,} \end{cases}$$

and wherein $1/f_{max}$ is a threshold value.

9. The device in claim 1, wherein the receiver is a wireless receiver or the receiver is a wired receiver.

10. The device in claim 1, wherein the electronic processing circuitry is configured to equalize the input signal or estimate a communications channel used to convey the input signal using the approximated inverse matrix.

11. The device in claim 1, wherein the electronic processing circuitry is configured to determine a signal quality associated with the input signal using the approximated inverse matrix.

12. The device in claim 1, wherein the electronic processing circuitry is configured to perform multi-user detection using the approximated inverse matrix.

13. The device in claim 1, wherein the receiver is a one of a G-RAKE radio receiver and a chip equalizer.

14. The device of claim 1, wherein the device is one of a radar receiver and a sonar receiver.

15. The device of claim 1, wherein the electronic processing circuitry is configured to compute minors or cofactors of the matrix and to use the computed minors or cofactors of the matrix in computing the adjoint and the scaling factor.

16. A method for estimating information from a signal, comprising:
    receiving in a receiver an input signal from one or more sensors, and
    electronic processing circuitry coupled to the receiver and performing the following steps:
        generating a matrix associated with the input signal;
        determining an approximation of an inverse of the matrix based on the adjoint of the matrix and a scaling factor associated with the determinant of the matrix;
        applying the approximated inverse matrix to the input signal to transform the input signal into an output signal; and
        determining and providing information associated with the input signal based on the output signal,
    wherein the electronic processing circuitry digitally filters the input signal using weights derived from the approximated inverse matrix.

17. The method in claim 16, wherein the electronic processing circuitry approximates the inverse of the matrix by multiplying the adjoint of the matrix by the scaling factor associated with a determinant of the matrix.

18. The method in claim 16, wherein the electronic processing circuitry applies the adjoint of the matrix to the input signal to transform the input signal into an intermediate signal and then to apply the scaling factor to the intermediate signal to produce the output signal.

19. The method in claim 16, wherein the electronic processing circuitry approximates the inverse of the matrix by an adjoint of the matrix and a scaling function associated with a determinant of the matrix, said scaling function comprising thresholding a function of the determinant of the matrix.

20. The method in claim 19, wherein the electronic processing circuitry compensates the output signal for the approximation.

21. The method in claim 16, wherein the electronic processing circuitry computes minors or cofactors of the matrix and shares them in computing the adjoint and the scaling factor.

22. The method in claim 16, wherein the matrix R is Hermitian symmetric.

23. The method in claim 16, wherein the inverse of matrix R is defined as:

$$R^{-1} = \left(\frac{1}{\det(R)}\right) adj(R)$$

where $$\left(\frac{1}{\det(R)}\right)$$

is the determinant of matrix R and adj(R) is the adjoint of matrix R, wherein the electronic processing circuitry is configured to approximate the inverse of matrix R using: $R^{-1} \approx f(R) adj(R)$, wherein $$f(R) = \begin{cases} 1/\det(R), & \det(R) > 1/f_{max} \\ f_{max}, & \text{otherwise,} \end{cases}$$

and wherein $f_{max}$ is a threshold value.

24. The method in claim 16, wherein the receiver is a wireless receiver or the receiver is a wired receiver.

25. The method in claim 16, wherein the electronic processing circuitry equalizes the input signal or estimate a communications channel used to convey the input signal using the approximated inverse matrix.

26. The method in claim 16, wherein the electronic processing circuitry determines a signal quality associated with the input signal using the approximated inverse matrix.

27. The method in claim 16, wherein the electronic processing circuitry performs multi-user detection using the approximated inverse matrix.

* * * * *

UNITED STATES PATENT AND TRADEMARK OFFICE
CERTIFICATE OF CORRECTION

PATENT NO.         : 8,045,645 B2                                             Page 1 of 1
APPLICATION NO.    : 11/969692
DATED              : October 25, 2011
INVENTOR(S)        : Bottomley It is certified that error appears in the above-identified patent and that said Letters Patent is hereby corrected as shown below:

Title Page 2, Item (56), under "OTHER PUBLICATIONS", in Column 1, Line 1,
delete "Caines" and insert -- Cairns --, therefor.

In Column 3, Line 37, delete "is flowchart" and insert -- is a flowchart --, therefor.

In Column 3, Line 48, delete "is non-limiting" and insert -- is a non-limiting --, therefor.

In Column 3, Line 51, delete "is flowchart" and insert -- is a flowchart --, therefor.

In Column 3, Line 61, delete "embodiments" and insert -- embodiments. --, therefor.

In Column 5, Line 15, delete "matrix." and insert -- matrix, --, therefor.

In Column 9, Line 21, delete "is flowchart" and insert -- is a flowchart --, therefor.

In Column 12, Line 57, in Claim 8, delete "where is" and insert -- is --, therefor.

Signed and Sealed this
Fifteenth Day of May, 2012

David J. Kappos
*Director of the United States Patent and Trademark Office*